United States Patent
Nguyen

(10) Patent No.: US 11,928,470 B1
(45) Date of Patent: Mar. 12, 2024

(54) ADVANCING A PROGRAM COUNTER TO A START OF A SUBSEQUENT CACHE LINE BASED ON A STRADDLING GROUP INDICATOR IN A CURRENT CACHE LINE

(71) Applicant: VeriSilicon Holdings Co., Ltd, Grand Cayman (KY)

(72) Inventor: Tracy T. Nguyen, Lewisville, TX (US)

(73) Assignee: VeriSilicon Holdings Co., Ltd., Grand Cayman (KY)

( * ) Notice: Subject to any disclaimer, the term of this patent is extended or adjusted under 35 U.S.C. 154(b) by 0 days.

(21) Appl. No.: 17/725,356

(22) Filed: Apr. 20, 2022

(51) Int. Cl.
*G06F 9/32* (2018.01)
*G06F 9/30* (2018.01)
*G06F 9/38* (2018.01)

(52) U.S. Cl.
CPC .......... *G06F 9/321* (2013.01); *G06F 9/30076* (2013.01); *G06F 9/3802* (2013.01); *G06F 9/3816* (2013.01); *G06F 9/3853* (2013.01)

(58) Field of Classification Search
CPC .......... G06F 9/32; G06F 9/321; G06F 9/3802; G06F 9/3816; G06F 9/3853
See application file for complete search history.

(56) References Cited

U.S. PATENT DOCUMENTS

| | | | | |
|---|---|---|---|---|
| 5,669,001 A * | 9/1997 | Moreno | ................. | G06F 9/3853 712/E9.05 |
| 5,848,288 A * | 12/1998 | O'Connor | ............. | G06F 9/3853 712/210 |
| 5,935,238 A * | 8/1999 | Talcott | ................. | G06F 9/30054 712/237 |
| 6,415,376 B1 * | 7/2002 | Mohamed | .............. | G06F 9/3853 712/213 |
| 6,477,639 B1 * | 11/2002 | Krishnan | ............. | G06F 9/30058 712/237 |
| 9,804,853 B2 * | 10/2017 | Park | ....................... | G06F 9/3853 |
| 2002/0049964 A1 * | 4/2002 | Takayama | ............... | G06F 9/324 712/E9.055 |

(Continued)

FOREIGN PATENT DOCUMENTS

EP          1251425 A2 *  10/2002  ........... G06F 9/3802

OTHER PUBLICATIONS

Yim et al., "Single Cycle Access Cache for the Misaligned Data and Instruction Prefetch", IEEE, 1997, pp. 677-678.*

*Primary Examiner* — David J. Huisman

(57) ABSTRACT

Introduced herein is a program counter advancing technique that uses NOP padding without its limitations. During a build process, the introduced technique removes EOG markers for instruction groups that are immediately followed by the NOP instructions that are immediately followed by an instruction group beginning at a start of a cache line. As such, during an execution process, when the processing unit detects an absence of an EOG marker in the requested instruction group, it knows that a group of NOP instructions are about to follow and skips over them by directly advancing the program counter to a start of a subsequent cache line where the next instruction group starts. In addition to the presence of an EOG marker, the introduced technique also takes into account whether the requested instruction group is a straddling group when advancing the program counter to a start of the subsequent cache line.

21 Claims, 5 Drawing Sheets

(56) References Cited

U.S. PATENT DOCUMENTS

| | | | | |
|---|---|---|---|---|
| 2002/0091892 A1* | 7/2002 | Vondran, Jr. | ........ | G06F 9/30156 |
| | | | | 711/3 |
| 2002/0116567 A1* | 8/2002 | Vondran, Jr. | ........ | G06F 12/1045 |
| | | | | 711/E12.047 |
| 2007/0294513 A1* | 12/2007 | Ali | ........................ | G06F 9/3802 |
| | | | | 712/206 |

* cited by examiner

ADVANCING A PROGRAM COUNTER TO A START OF A SUBSEQUENT CACHE LINE BASED ON A STRADDLING GROUP INDICATOR IN A CURRENT CACHE LINE

TECHNICAL FIELD

This application is directed, in general, to dispatching an instruction group from a cache for execution and, more specifically, to reducing a latency associated with dispatching in instruction group using a program counter advancing technique.

BACKGROUND

The program counter (PC) is a register that manages the memory address of an instruction group to be dispatched for execution. Usually, the PC is incremented after dispatching an instruction group, and holds the memory address of ("points to") the next instruction group that would be executed.

When executing a program, there may be multiple points of discontinuity, such as a function start or a loop start, where multiple paths converge. It would be advantageous to have a mechanism that can dispatch an instruction group at such points of discontinuity with the least amount of latency because the extended latency at those points can delay and bottleneck the sequential flow of the entire program.

SUMMARY

One aspect of the application is directed to a method for executing a program. The method includes: determining whether a requested instruction group in a current cache line has an End-of-Group (EOG) marker; and when the EOG marker is absent from the requested instruction group, advancing a program counter directly to a start of a subsequent cache line that follows the current cache line based on a straddling group indicator in the current cache line.

Another aspect is directed to a processor for executing a program. The processor includes a cache including a plurality of cache lines, and a processing unit that performs operations including: determining whether a requested instruction group in a current cache line of the cache lines includes an End-of-Group (EOG) marker; and when the EOG marker is absent from the requested instruction group, advancing a program counter directly to a start of a subsequent cache line that follows the current cache line based on a straddling group indicator in the current cache line.

Yet another aspect is directed to a system for executing a program. The system includes an external memory storing a plurality of instruction groups including a requested instruction group; a cache including a plurality of cache lines, wherein the requested instruction group is loaded into a current cache line of the cache lines from the external memory, and a processing unit that performs operations including: determining whether the requested instruction group in the current cache line has an End-of-Group (EOG) marker; and when the requested instruction group does not have the EOG marker, advancing a program counter directly to a start of a subsequent cache line that follows the current cache line based on a straddling group indicator in the current cache line.

BRIEF DESCRIPTION

Reference is now made to the following descriptions taken in conjunction with the accompanying drawings, in which.

DETAILED DESCRIPTION

Figure 1:
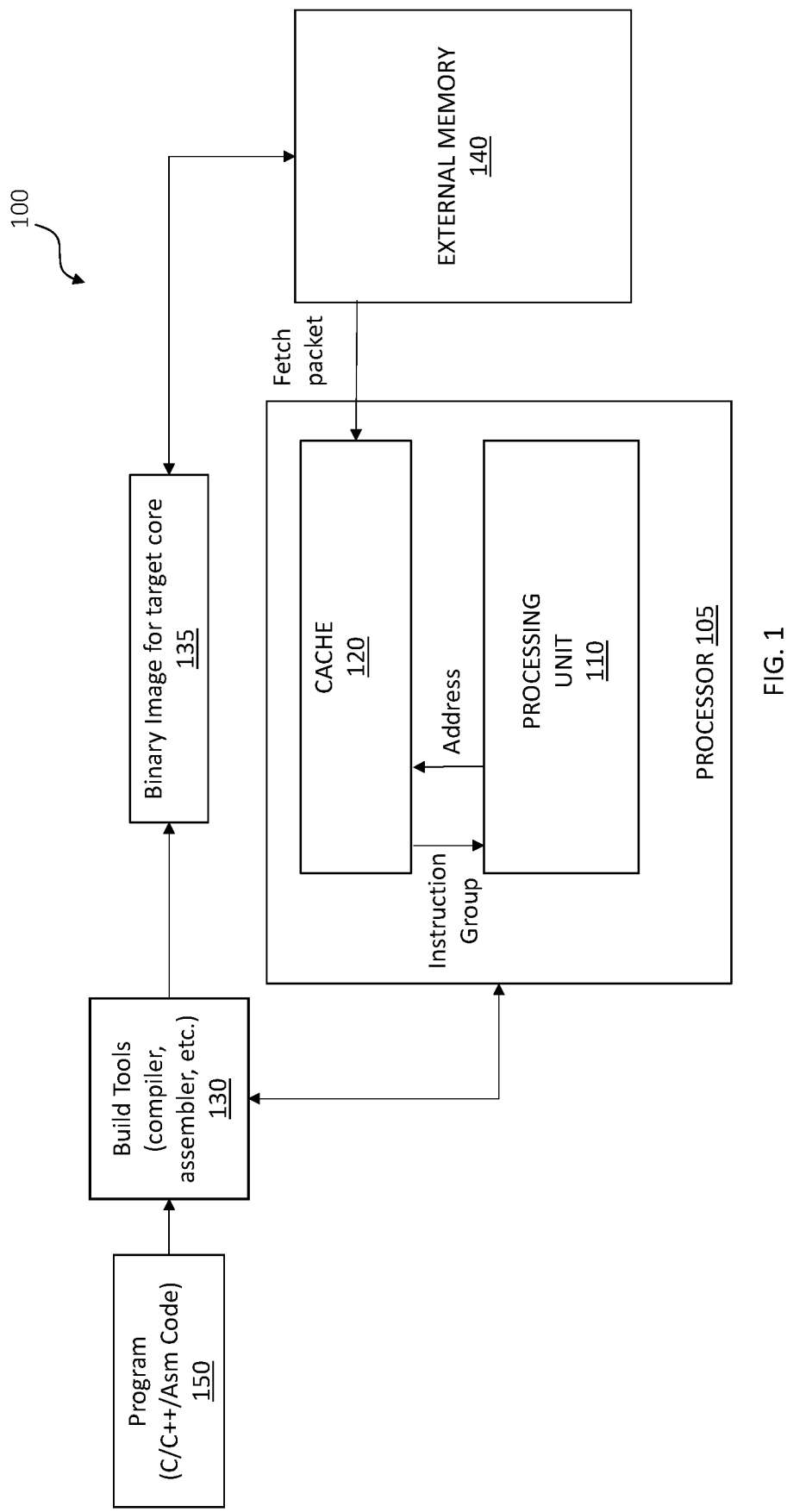
FIG. 1 illustrates an example computing system that is implemented according to the principles of the current disclosure.

During execution, instruction groups from an external memory are loaded into an internal memory of the processor, such as a cache, so that they can be dispatched with reduced latency in the future. A cache, however, only has a limited number of lines that are limited in size, and when an instruction group that is larger than the space available in a given cache line is loaded, such a group will rollover and span multiple cache lines. This type of instruction group is referred in the current disclosure as a straddling instruction group.

Dispatching a straddling instruction group involves an extended latency since it requires loading multiple cache lines, in addition to determining start and end of the straddling instruction group. Compared to a straddling instruction group, dispatching a non-straddling instruction group will have a lower latency because it involves loading just one line, although it still requires determining start and end of the non-straddling instruction group. An instruction group with the least latency is hence an instruction group that does not straddle and is aligned to a start of a cache line because all that would be required then is to determine an end of the instruction in the cache line.

One of the techniques that may be used to locate instruction groups at desired locations, such as a beginning of a cache line, multiple of an address, is an alignment enforcement. When the alignment is enforced, an instruction group that does not fall at a desirable location is moved to a desirable location by filling intermediate words with NOP or no-op instructions, whose execution by a processor has no effect on register state or functionality. This filling process is called NOP padding. While enforcing alignment with NOP padding does reduce the latency, its effectiveness is limited because it would require spending cycles to execute the NOP padding, which have no functional purpose.

Introduced herein is a program counter advancing technique that allows the use of NOP padding without its limitations. During a build process, the introduced technique removes End-of-Group (EOG) markers for instruction groups that are followed by the NOP instructions using one or more build tools. As such, during an execution process, when the processing unit detects an absence of an EOG marker in the requested instruction group, it knows that a group of NOP instructions are about to follow and skips over them by directly advancing the program counter to the start of a cache line where the next instruction group starts. Referring a cache line wherein the requested group starts as a current line, the next instruction group starts at the start of a cache line that immediately follows the current cache line when the requested group is a non-straddling group without an EOG marker, and the next instruction group starts at the start of a cache line that is subsequent to the cache line that immediately follows the current cache line, e.g., a cache line that is two lines subsequent to the current cache line, when the requested group is a straddling group without an EOG marker. As such, in addition to the presence of an EOG marker, the introduced technique also takes into account whether the requested instruction group is a straddling group when advancing the program counter to the start of a cache line where the next instruction group starts.

By skipping over NOP instructions that consume unnecessary clock cycles, the introduced technique makes an effective use of NOP padding without suffering from its limitation, reducing latencies in dispatching instruction groups that have been aligned to a start of a cache line. Moreover, as the introduced technique takes the straddling status of the requested instruction group into account when advancing the program counter, its effectiveness is not compromised even when dealing with a straddling instruction group.

FIG. 1 illustrates an example of a computing system 100 that is implemented according to the principles of the current disclosure. The illustrated example shows a processor 105 with an instruction set architecture that achieves an instruction-level parallelism, such as a superscalar and/or a Very Long Instruction Word (VLIW) architecture. Also shown are build tools 130 that creates an executable binary image 135 from a high level program code 150 and an external memory 140 that stores the created binary image.

The build tools 130 are software-implemented tools that may include one or more of: a preprocessor, a compiler, an assembler, a linker, and a loader. The build tools 130 are used to create the executable binary image 135 during the build process according to a sequence of instruction groups and alignment directives of the program code 150. The created image 135 comprises a series of instruction groups that are either followed by EOG markers or NOP instructions. Operations involving removing EOG markers from and adding NOP instructions to instruction groups are discussed in more details below with FIG. 2.

Table 1 shows an example sequence of instruction groups and alignment directives in a program code.

TABLE 1

Outer_loop_beg1:
    Group_A
    Group_B
    .align 32
    Inner_loop_beg0:
        Group_1
        Group_2
        Group_3
        Group_4
    Inner_loop_exit0:
    Group_C
    Group_D
Outer_loop_exit1:

In an executable binary image created from the above example sequence, instruction groups, e.g., Groups A, C, D and Groups 1, 2, 3, 4, that do not precede an alignment directive .align 32, would be followed by EOG markers, an instruction group, e.g., Group B, that precedes the alignment directive, would be followed by one or more NOP instructions and would be aligned to an address that is a multiple of 32 bytes. In this example, as the size of the directive matches the size of a cache line, when Group B is loaded into a cache, its starting location would be aligned to a start of a cache line.

The processor 105 includes at least one processing unit 110, such as a processing core, and a cache 120. The processing unit 110 and the cache 120 are communicatively connected to one another and also to the external memory 140 using conventional means. It is understood that although not illustrated, the processor 105 may include other conventional components and functional units of a processor, such as an input/output interface, a fetcher, a decoder, a dispatcher, and execution units.

During execution process, the processing unit 110 executes a series of instruction groups in a binary image that has been created from the program code 150 during the build process. To reduce the latency in executing the instruction groups, the processing unit 110 performs operations, such as dispatching requested instruction groups and advancing the program counter, based on EOG markers and straddling group indicators.

In one example, the processing unit 110 determines whether a requested group in a current cache line has an EOG marker. When the requested group has the EOG marker, the processing unit dispatches the requested instruction group and advances the program counter to the end of the requested instruction group, and when the requested group does not have an EOG marker, the processing unit dispatches the maximum number of instructions and advances the program counter directly to a start of a subsequent cache line that follows the current cache line based on a straddling group indicator in the current cache line. The subsequent cache line immediately follows the current cache line when the straddling group indicator indicates that the requested group is not a straddling instruction group, and the subsequent cache line is subsequent to a cache line that immediately follows the current cache line when the straddling group indicator indicates that the requested group is a straddling instruction group.

The cache 120 is a temporary storage for the instruction groups of the binary image 135 loaded from the external memory 140. The cache 120 includes a plurality of cache lines of a uniform size. In the illustrated examples of the current disclosure, the size of each cache line is 32 bytes. Other examples of various sizes of a cache line are 16 bytes and 64 bytes. As the cache 120 tends to be smaller than the external memory 140, multiple addresses of the external memory 140 are mapped to a single cache location. A presence of an instruction group in its entirety in the cache 120 is called a "cache hit" and an absence is a "cache miss."

The external memory 140 stores a plurality of instructions groups and NOP instructions of the created binary image 135. When the cache 120 issues a cache miss of a requested instruction group, the external memory 140 fills the cache 120 with a fetch packet that corresponds to a cache line and includes the requested instruction group. The external memory 140 may be a conventional memory, such as a double data rate (DDR) memory or synchronous dynamic random access memory (SDRAM).

Figure 2:
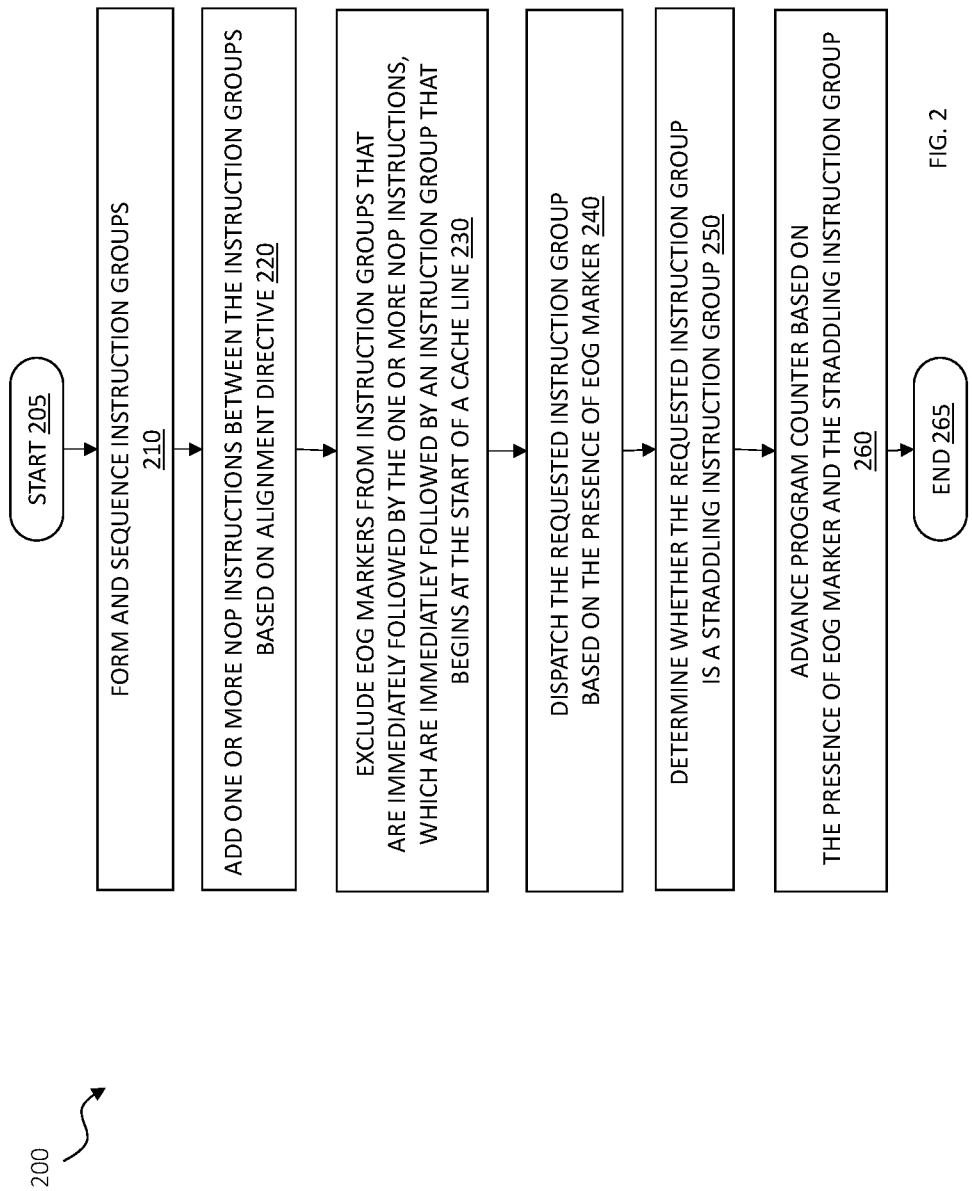
FIG. 2 illustrates an example method for executing a program according to the principles of the current disclosure.

FIG. 2 illustrates an example of a method 200 for executing a program according to the principles of the current disclosure. The method 200 may be divided into two parts. The first part corresponds to operations performed during a build process and includes steps 210-230 that are performed using one or more build tools, e.g., 130 in FIG. 1. The second part corresponds to operations performed during an execution process and includes steps 240-260 that are performed by a processor, such as 105 in FIG. 1. The method 200 starts at step 205, when the program to be executed is being built during a build process.

At step 210, using one or more build tools, such as a complier, an assembler, and/or a linker, instruction groups and corresponding control words are formed and sequenced as a series of fetch widths, each of which corresponds to a single cache line. Each instruction group is formed with instructions that can be dispatched together, e.g., in a single clock cycle, and the formed groups and corresponding control words are sequenced based on the sequence of the instruction groups in the program code. At the end of each instruction group, an EOG marker may be inserted. It is understood that the terms "fetch packet" and "fetch width" may be used interchangeably in the current disclosure as they both refer to a block of data that corresponds to and occupies a single cache line.

At step 220, for each alignment directive in the program code, one or more NOP instructions are added between the instructions groups based on the location and a size of each alignment directive in the program code. For example, for an alignment directive that has a set value that matches a size of a cache line and is located between two instruction groups, a number of NOP instructions are added to the end of the instruction group that precedes the directive such that the instruction group following the directive would be aligned to a start of a subsequent fetch width, or a subsequent cache line when loaded into a cache. Step 220 is performed using one or more build tools.

It is understood that during or after step 220, straddling group indicators are encoded into respective control words. A straddling group indicator indicates whether any of instruction groups within a given fetch width is a straddling group, and if so, identifies the straddling group.

Figure 3A:
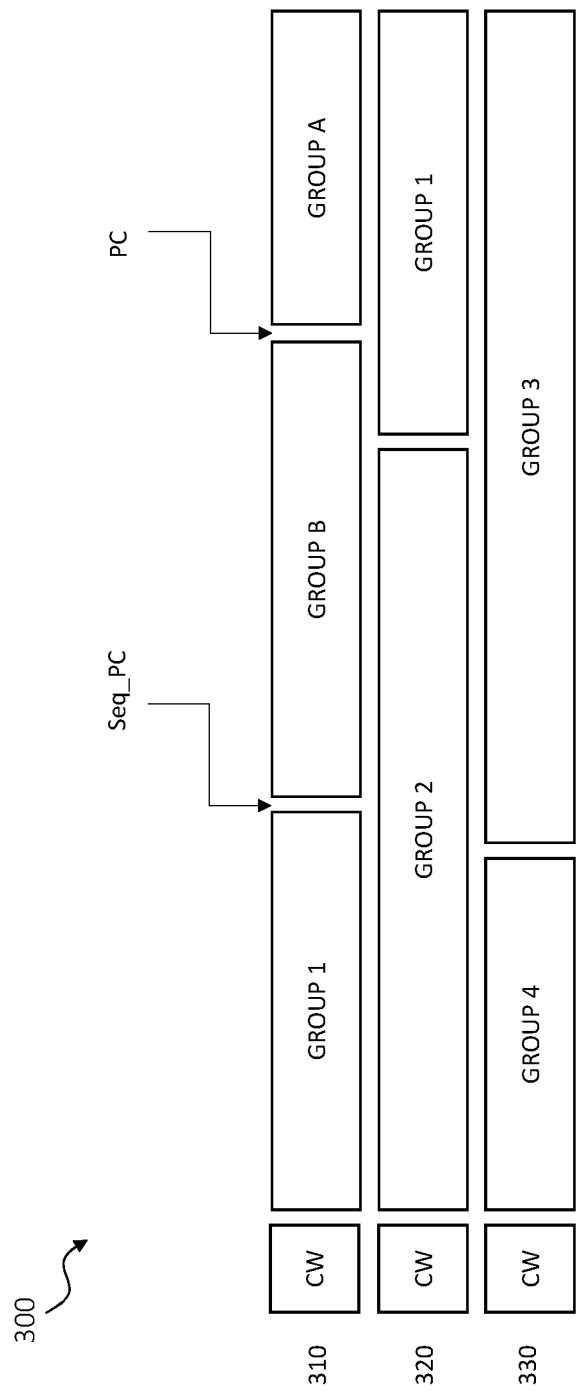
FIGS. 3A-C illustrate examples of how instruction groups in a cache are aligned and dispatched according to the principles of the current disclosure.
Figure 3B:
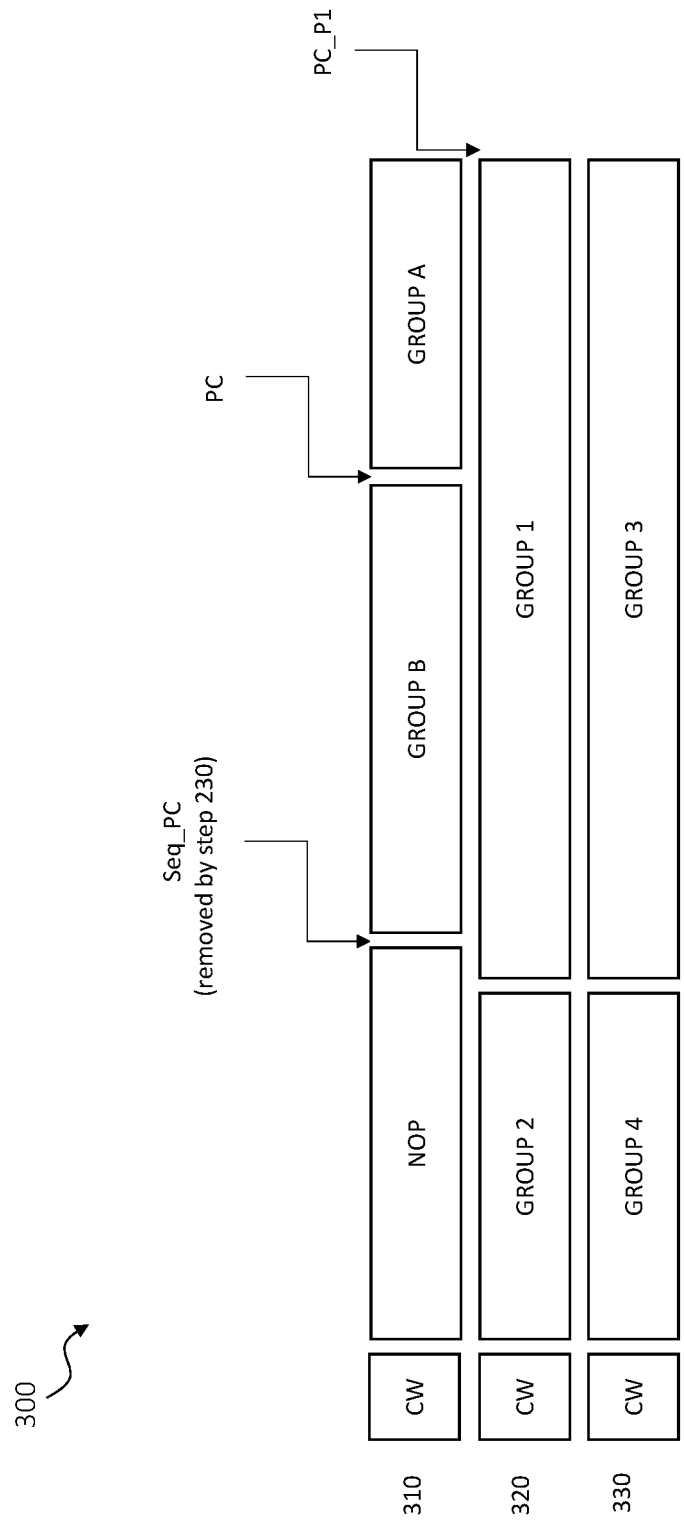
Figure 3C:
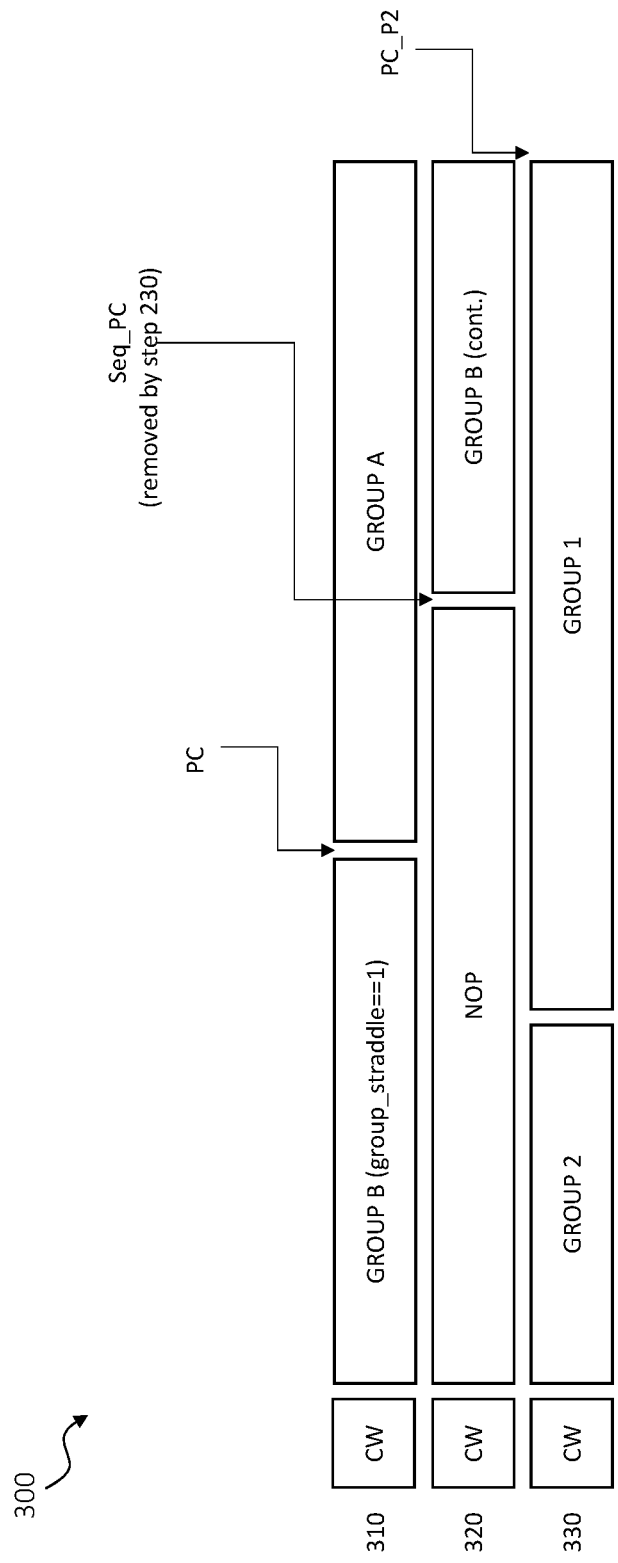

FIG. 3A-3C illustrates examples of how instruction groups may be aligned within a cache when they are loaded into the cache during an execution process according to the principles of the current disclosure. A cache 300 may correspond to a cache that is located inside a processor, such as the cache 120 in FIG. 1. The cache 300 has a plurality of cache lines, 310, 320, 330, each of which is 32 bytes long. The value of the alignment directive is 32 bytes. As the cache 300 is filled line by line from top to bottom and from right to left, the line 310 may be considered as a first line, the line 320 may be considered as a second line that immediately follows the first line 310, and the line 330 may be considered as a third line that immediately follows the second line 320. It is understood that a number of cache lines in the cache 300 is not limited to three and may include many more in practice.

FIG. 3A shows a sequence of instruction groups and control words (CW) in the cache 300 when no alignment directive is used in the program code. As shown, the instruction groups in the cache 300 are sequenced one after another without any NOP padding inserted there between. On the other hand, FIGS. 3B and 3C show the same sequence of instructions and control words in the cache 300 when an alignment directive is used between Group B and Group 1. In FIG. 3B, a number of NOP instructions that can push the Group 1 to the start of the second cache line 320 has been added to the end of Group B in the first cache line 310, and in FIG. 3C, a number of NOP instructions that can push the Group 1 to the start of the third cache line 330 are added to the end of Group B in the second cache line 320. 1. In FIG. 3B, a number of NOP instructions that can push the Group 1 to the start of the second cache line 320 has been added to the end of Group B in the first cache line 310, and in FIG. 3C, a number of NOP instructions that can push the Group 1 to the start of the third cache line 330 are added to the end of Group B in the second cache line 320.

At step 230, an End of Group (EOG) marker is removed from each instruction group that is immediately followed by the added NOP instructions that are immediately followed by an instruction group that would begin at the start of a cache line. In other words, when NOP instructions are added between two instruction groups and the added NOP instructions push the latter instruction group such that it would be aligned to the start of a cache line, an EOG marker is removed from the former instruction group. As such, an EOG marker is removed only from instruction groups that are immediately followed by NOP instructions that have been added by an alignment directive that matches the fetch width of the processing unit, e.g., 32 bytes. Step 230 is performed using one or more build tools.

Continuing with the above examples, in FIG. 3A, as no NOP instruction has been added during the step 220, no EOG is removed at the step 230 and all the instruction groups retains an EOG marker when loaded into the cache 300. In FIGS. 3B and 3C, NOP instructions have been added during the step 220, and an EOG marker is removed from Group B at the step 230 because Group B is immediately followed by the added NOP instructions that are immediately followed by Group 1, which would begin at the start of a cache line, i.e., 320 when loaded into the cache. All other groups in FIGS. 3B and 3C, except Group B, retain an EOG marker.

As mentioned before, steps 210-230 are performed during the build process, which ends when the instructions groups are stored in the external memory. The method 200 continues at step 240 when the instruction groups are loaded into a cache and a processing unit receives a request for dispatching an instruction group. At this point, a current value of a program counter points, such as represented by PC in FIGS. 3A-3C, to a location in a cache line where the requested group starts.

The processing unit dispatches the requested group at step 240 based on a presence of the EOG marker for the requested group. When an EOG marker is present, the processing unit dispatches the requested instruction group by dispatching only those instructions that are in the requested group, i.e., issuing up to an EOG marker. When an EOG marker is not present, the processing unit dispatches a maximum number of instructions allowed by an architecture of the processing unit.

By dispatching the maximum number of instructions, the requested group is always dispatched and depending on a number of the instructions in the requested group, one or more NOP instructions following the requested instruction group may also be dispatched. For example, assuming the maximum number of instructions that can be dispatched at a time by a given processing unit is four, if a requested group has only two instruction, the given processing unit would dispatch the two instructions in the requested group and up to two NOP instructions that immediately follow.

At step 250, the processing unit determines whether the requested group is a straddling group. This may be determined based on straddling group indicator that is encoded in control words that correspond to the requested group. The control words that include the straddling group indicator are located in the same cache line as the requested group.

At step 260, based on the determinations made at steps 240 and 250, the processing unit advances the program counter. There may be three different advancing scenarios. First scenario is when there is an EOG marker, and in such a scenario, the processing unit advances the value of the program counter to the start of a group immediately following the requested instruction group by adding a size of the requested group to the current value of the program counter. Second scenario is when there is no EOG marker and the requested group is not a straddling group. In such a scenario, the processing unit advances the value of the program counter to the start of a subsequent cache line that immediately follows the current cache line where the requested group is located. Third scenario is when there is no EOG marker and the requested group is a straddling group. In this scenario, the processing unit advances the value of the program counter to the start of a cache line that is subsequent to a cache line that immediately follows the current cache line where the requested group is first located. As such, an absence of an EOG marker indicates that the value of the program counter needs to be advanced to one of the cache lines that are subsequent to the current cache line, and when the EOG marker is absent, the straddling group indicator indicates which one of the subsequent cache lines the value of the program counter needs to be advanced to.

It is understood that the step 260 may be implemented using a program counter (PC) computation logic. An example of pseudo code for program counter advancement may look like this:

TABLE 2

```
Seq_PC = PC + Current_group_size
If ( (!eog_found))
   If (group_straddle)
      Next_pc = PC_P2
   Else
      Next_pc = PC_P1
Else
   Next_pc = Seq_PC
```

In the above table, Next_PC represents a value of the PC after the requested group has been dispatched, Seq_PC is an address at the end of the requested group, PC_P1 is an address at the beginning of the subsequent cache line, and PC_P2 is an address at the beginning of a cache line following the subsequent cache line.

How instructions are dispatched and the program counter advances in the above three scenarios is explained using the previous examples in FIGS. 3A-C. In these examples, the Group B is the requested group and the PC represents the current location of the program counter.

FIG. 3A illustrates the first scenario where an EOG marker for Group B is present. Here, the processing unit dispatches Group B and advances Next_PC to the end of Group B, where Seq_PC is. Program counter logic determines Seq_PC by adding the size of the Group B to the value of PC. It is understood that for the first scenario, whether Group B is a straddling group or not does not affect the how the program counter advances.

FIG. 3B illustrates the second scenario when an EOG marker for a requested group is not present and the requested is not a straddling group. Here, the PC is pointing at the start of the Group B, which has two instructions, and the maximum number of instructions that can be dispatched is four. Since an EOG marker for Group B has been omitted during the build process, the processing unit dispatches a maximum number of instructions, which include Group B and two of the NOP instructions. The processing unit determines that the Group B is not a straddling group. From that determination and the absence of the EOG marker for Group B, the program counter logic advances Next_PC to PC_P1, the start of the second line 320 that immediately follows the first cache line 310.

FIG. 3C illustrates the third scenario when an EOG marker for a requested group is not present and the requested group is a straddling group. In this example, the PC is pointing at the start of the Group B that has three instructions and maximum number of instructions that can be dispatched is four. Since Group B is followed by NOP instructions, an EOG marker for Group B has been omitted during the build process. As such, the processing unit dispatches a maximum number of instructions, which includes Group B and one of the NOP instructions. The processing unit determines that Group B is a straddling group. From that determination and the absence of the EOG marker for Group B, the processing unit advances Next_PC to PC_P2, the start of the third cache line 330 that is subsequent to the second cache line 320 that immediately follows the first cache line 310. As shown, for the third scenario, the program counter needs to be advanced further than the second scenario, e.g., at least one more cache line, because the requested group will occupy at least two cache lines.

Once step 260 is performed, the method 200 proceed to step 265 and ends.

A portion of the above-described apparatus, systems or methods may be embodied in or performed by various digital data processors or computers, wherein the computers are programmed or store executable programs of sequences of software instructions to perform one or more of the steps of the methods. The software instructions of such programs may represent algorithms and be encoded in machine-executable form on non-transitory digital data storage media or non-transitory computer-readable medium, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, or functions, systems or apparatuses described herein.

Portions of disclosed embodiments may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

In interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Those skilled in the art to which this application relates will appreciate that other and further additions, deletions, substitutions, and modifications may be made to the described embodiments. It is also to be understood that the terminology used herein is for the purpose of describing particular embodiments only, and is not intended to be limiting, since the scope of the present disclosure will be limited only by the claims. Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of the exemplary methods and materials are described herein.

Each of the aspects disclosed in the Summary may have one or more of the additional features of the dependent claims in combination. It is noted that as used herein and in the appended claims, the singular forms "a", "an", and "the" include plural referents unless the context clearly dictates otherwise.

What is claimed is:

1. A method for executing a program, comprising:
   determining whether a requested instruction group in a current cache line has an End-of-Group (EOG) marker; and
   when the EOG marker is absent from the requested instruction group, advancing a program counter directly to a start of a subsequent cache line that follows the current cache line based on a straddling group indicator in the current cache line, wherein the subsequent cache line is subsequent to a cache line that immediately follows the current cache line when the straddling group indicator indicates that the requested instruction group is a straddling instruction group.

2. The method of claim 1, wherein the subsequent cache line immediately follows the current cache line when the straddling group indicator indicates that the requested instruction group is not a straddling instruction group.

3. The method of claim 1, further comprising when the requested instruction group has the EOG marker, advancing the program counter to an end of the requested instruction group.

4. The method of claim 1, wherein the advancing the program counter directly to the start of the subsequent cache line includes skipping over one or more no-operation (NOP) instructions that have been added to an end of the requested instruction group during a build process.

5. The method of claim 4, wherein a start of a next instruction group immediately following the one or more NOP instructions is aligned with the start of the subsequent cache line.

6. The method of claim 4, further comprising excluding the EOG marker of the requested instruction group during the build process when an instruction group immediately following the one or more NOP instructions begins at the start of the subsequent cache line.

7. The method of claim 1, further comprising when the EOG marker is absent from the requested instruction group, dispatching a maximum number of instructions.

8. The method of claim 1, further comprising when the requested instruction group includes the EOG marker, dispatching instructions in the requested instruction group.

9. A processor for executing a program, comprising:
   a cache including a plurality of cache lines, and
   a processing unit that performs operations including:
     determining whether a requested instruction group in a current cache line of the cache lines includes an End-of-Group (EOG) marker; and
     when the EOG marker is absent from the requested instruction group, advancing a program counter directly to a start of a subsequent cache line that follows the current cache line based on a straddling group indicator in the current cache line, wherein the subsequent cache line is subsequent to one of the cache lines that immediately follows the current cache line when the straddling group indicator indicates that the requested instruction group is a straddling instruction group.

10. The processor of claim 9, wherein the subsequent cache line immediately follows the current cache line when the straddling group indicator indicates that the requested instruction group is not a straddling instruction group.

11. The processor of claim 9, wherein the operations further include when the requested instruction group has the EOG marker, advancing the program counter to an end of the requested instruction group.

12. The processor of claim 9, wherein the advancing the program counter directly to the start of the subsequent cache line includes skipping over one or more no-operation (NOP) instructions that have been added to an end of the requested instruction group during a build process.

13. The processor of claim 12, wherein a start of a next instruction group immediately following the one or more NOP instructions is aligned with the start of the subsequent cache line.

14. The processor of claim 12, wherein the EOG marker of the requested instruction group is excluded during the build process when an instruction group immediately following the one or more NOP instructions begins at the start of the subsequent cache line.

15. The processor of claim 9, wherein the operations further include when the EOG marker is absent from the requested instruction group, dispatching a maximum number of instructions.

16. The processor of claim 9, wherein the operations further include when the requested instruction group includes the EOG marker, dispatching instructions in the requested instruction group.

17. A system for executing a program comprising:
   an external memory storing a plurality of instruction groups including a requested instruction group;
   a cache including a plurality of cache lines, wherein the requested instruction group is loaded into a current cache line of the cache lines from the external memory, and
   a processing unit that performs operations including:
     determining whether the requested instruction group in the current cache line has an End-of-Group (EOG) marker; and
     when the requested instruction group does not have the EOG marker, advancing a program counter directly to a start of a subsequent cache line that follows the current cache line based on a straddling group indicator in the current cache line, wherein the subsequent cache line is subsequent to one of the cache lines that immediately follows the current cache line when the straddling group indicator indicates that the requested instruction group is a straddling instruction group.

18. The system of claim 17, wherein the subsequent cache line immediately follows the current cache line when the straddling group indicator indicates that the requested instruction group is not a straddling instruction group.

19. The system of claim 17, wherein the advancing the program counter directly to the start of the subsequent cache line includes skipping over one or more no-operation (NOP) instructions that have been added to an end of the requested instruction group during a build process.

20. The system of claim 19, wherein a start of a next instruction group immediately following the one or more NOP instructions is aligned with the start of the subsequent cache line.

21. The system of claim 19, wherein the EOG marker of the requested instruction group is excluded during the build process when an instruction group immediately following the one or more NOP instructions begins at the start of the subsequent cache line.

\* \* \* \* \*